June 1, 1965

T. BOX 3,186,586

PLASTIC CARRYING CASE

Filed Nov. 26, 1962

INVENTOR.
THEODOR BOX
BY

ATTORNEY

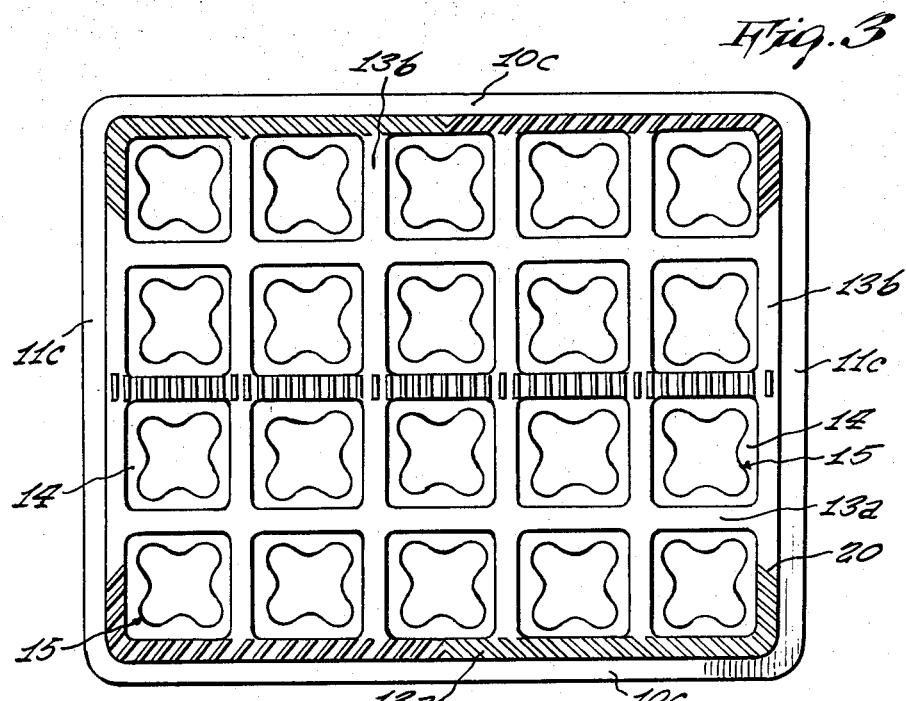
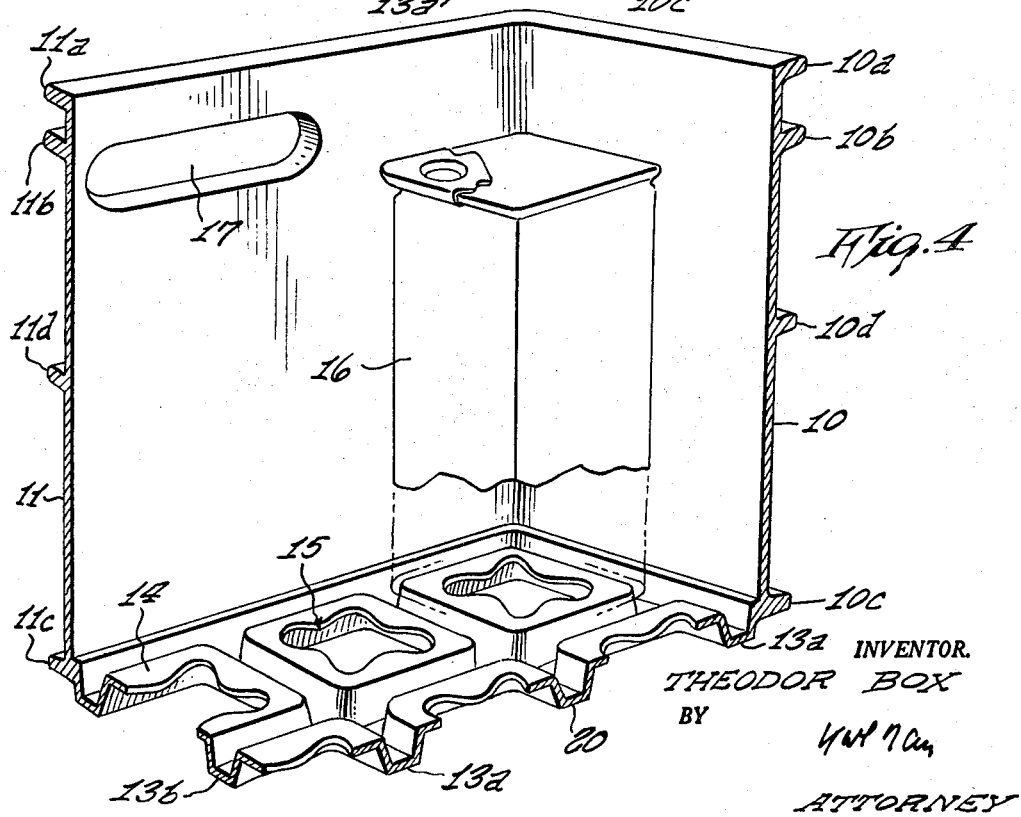

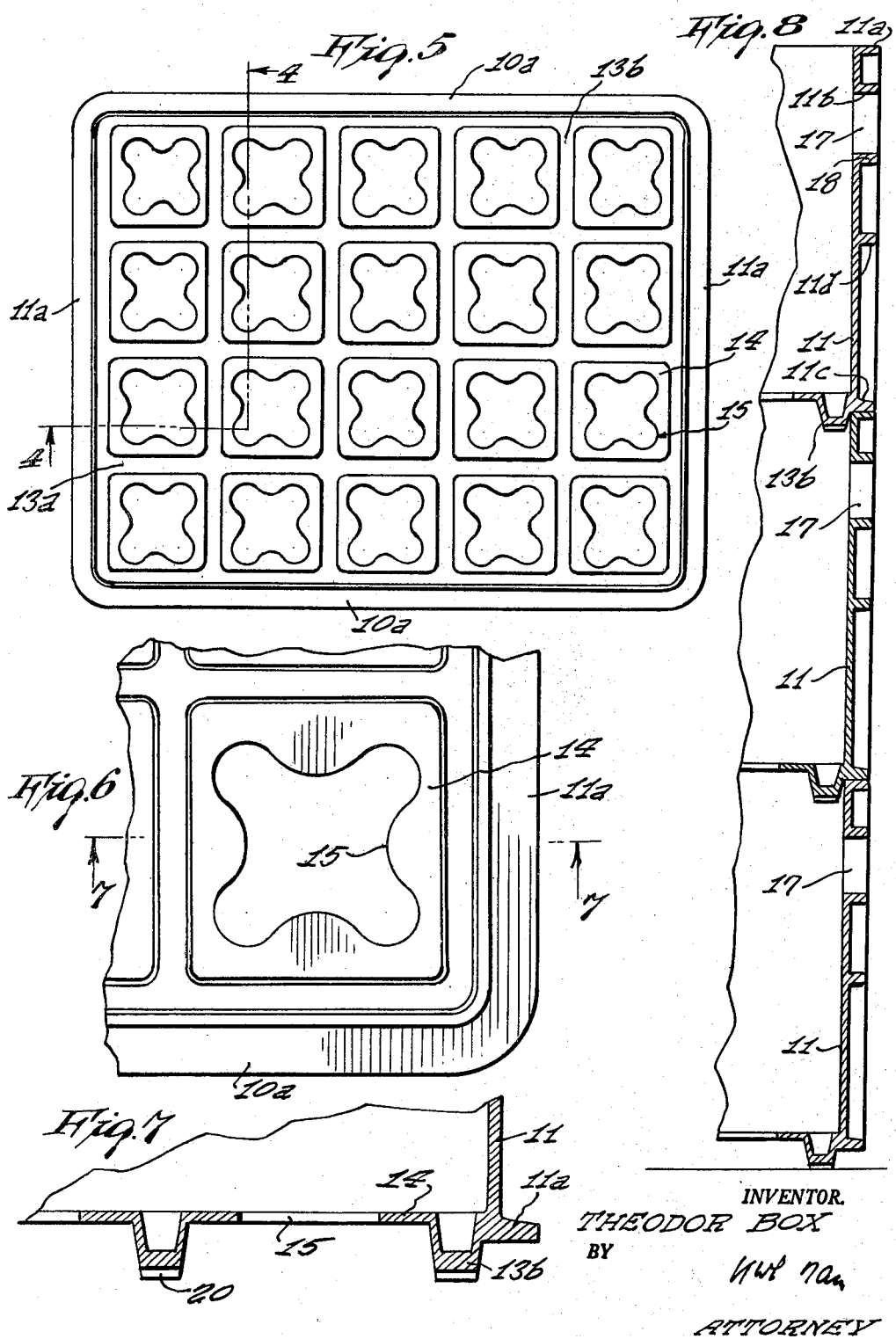

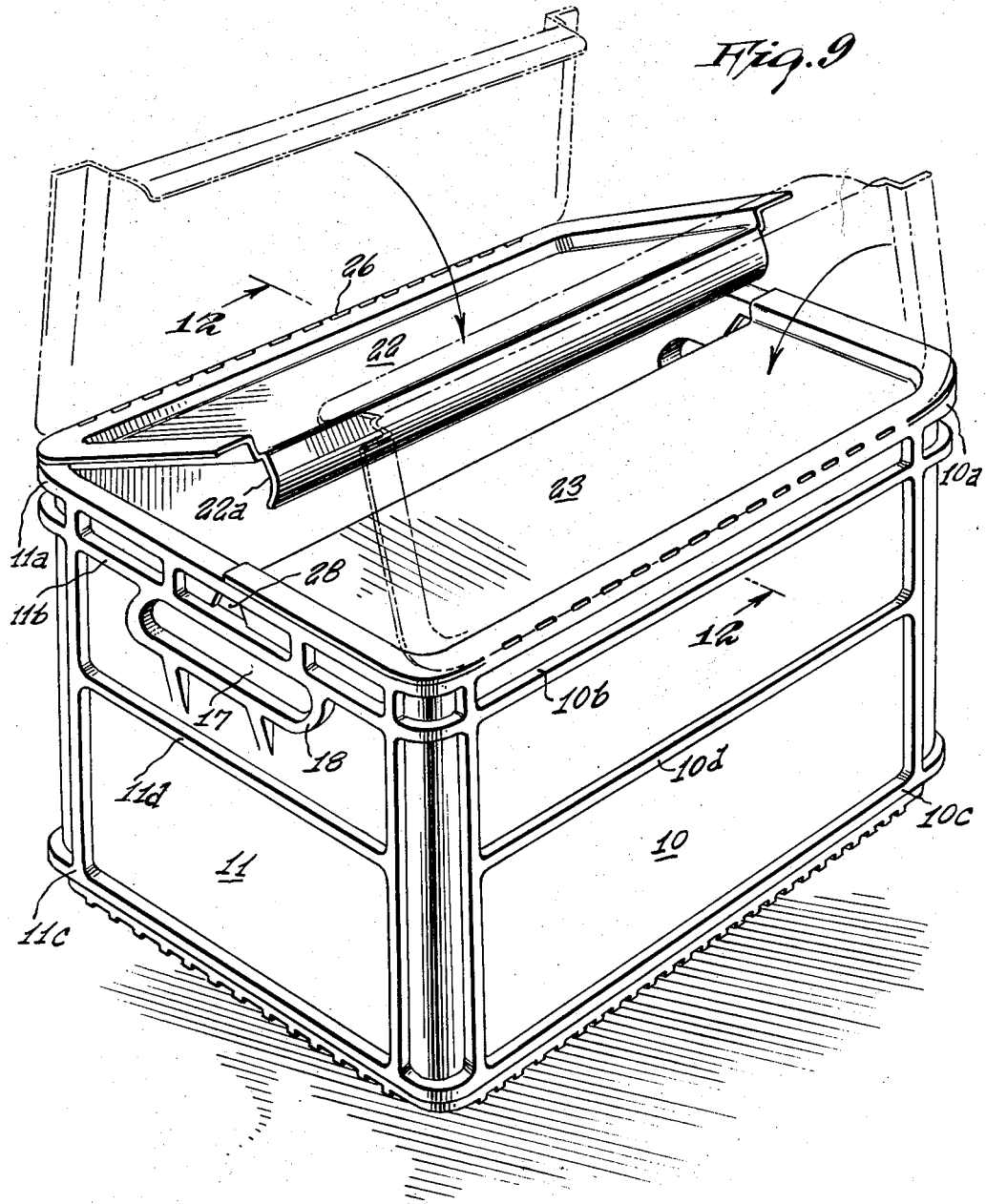

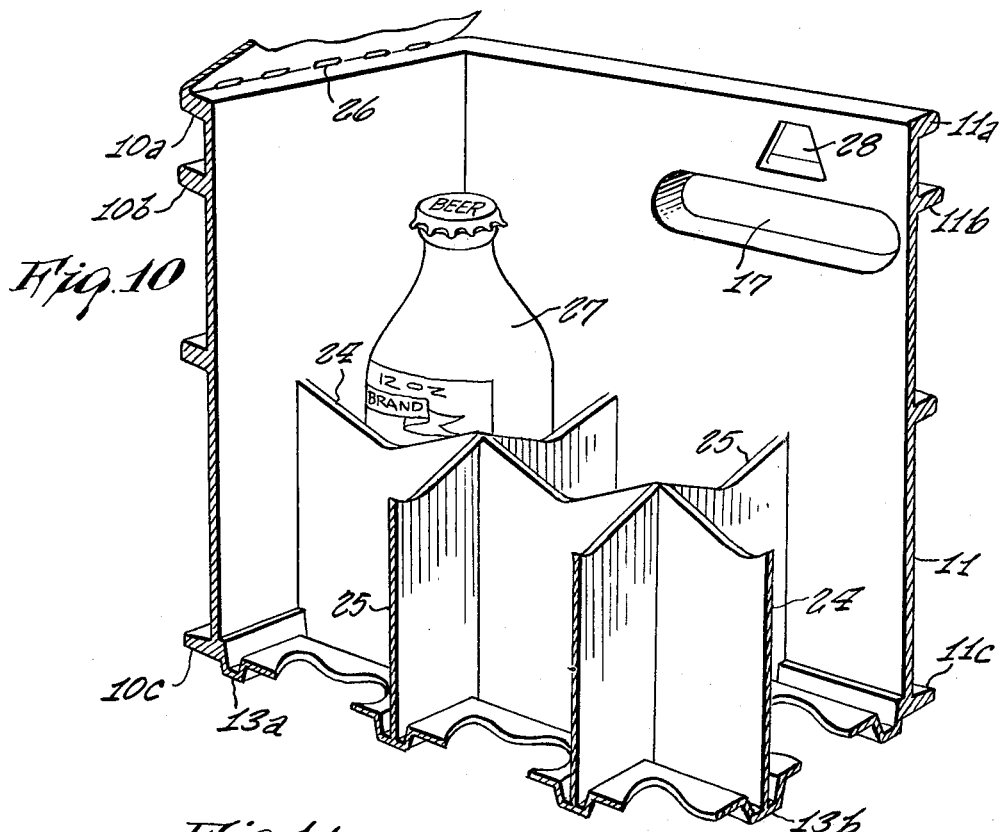
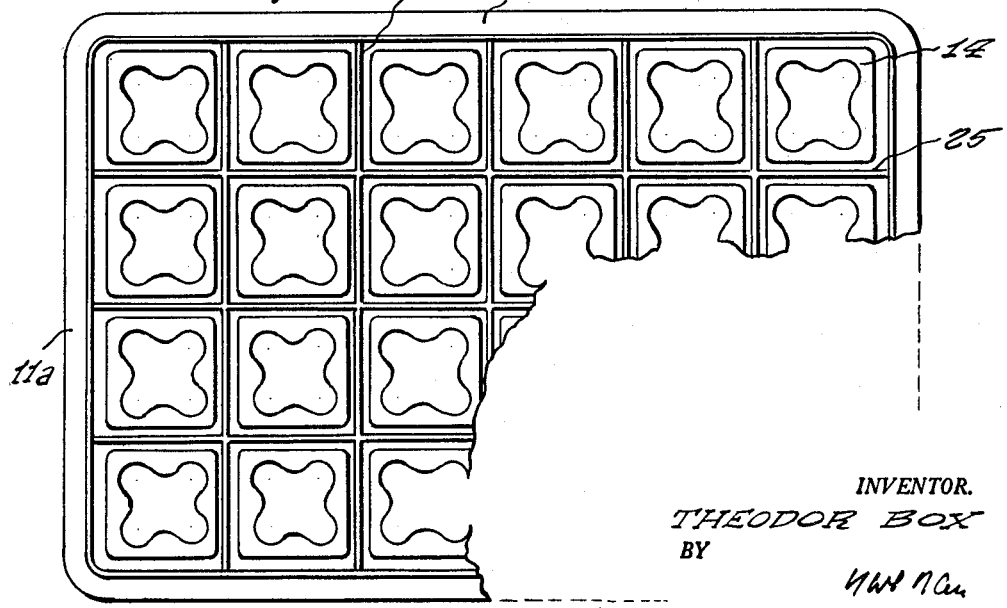

June 1, 1965  T. BOX  3,186,586
PLASTIC CARRYING CASE
Filed Nov. 26, 1962  6 Sheets-Sheet 6
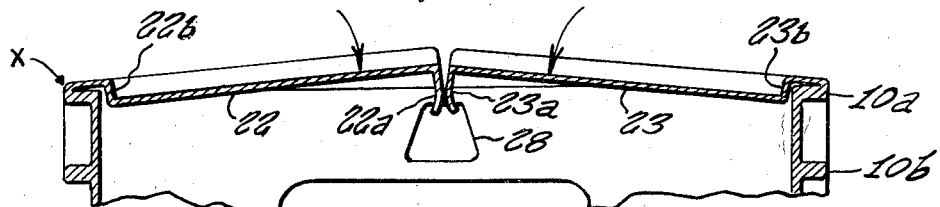
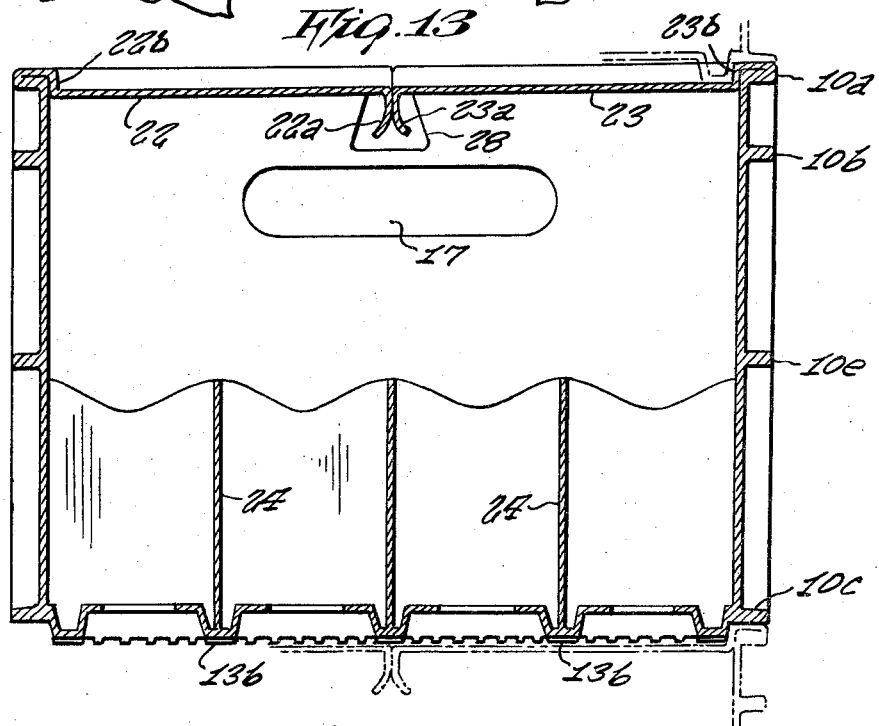
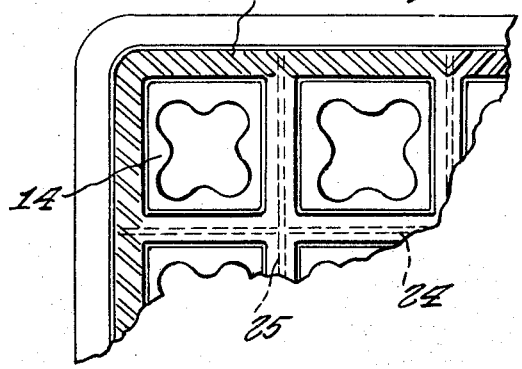
INVENTOR.
THEODOR BOX
BY
ATTORNEY United States Patent Office 3,186,586
Patented June 1, 1965

3,186,586
PLASTIC CARRYING CASE
Theodor Box, 57—02 251st St., Little Neck, N.Y.
Filed Nov. 26, 1962, Ser. No. 239,891
3 Claims. (Cl. 220—97)

The present invention relates to plastic carrying cases also known as "tote boxes" and serving for the storage and shipment of packaged bottled goods, such as glass bottles, cartons and the like containers of a relatively fragile nature as commonly used for the distribution of beer, milk, juices and the like foods or liquids.

The conventional beer and milk carrying cases being constructed of wood and/or metal possess a great number of disadvantages and shortcomings, foremost among which are their considerable weight, reduced life, lack of flexibility or resistance to shock or vibration during handling or transport, high hygroscopicity in absorbing large amounts of water or moisture, lack of resistance to fumes and acids, and numerous other defects and disadvantages well known to those skilled in the art.

In view of the disadvantages of the wooden or metallic carrying cases as enumerated above, attempts have been made in the past to produce bottled and the like beverage cases, in particular for the storage and shipment of beer, milk, fruit juices and the like, from appropriate high-impact synthetic plastic by molding the cases or boxes as an integral or unitary structure. The prior attempts to replace the conventional wooden or metal cases or boxes by molded or plastic cases have, however, been only partially successful due, among other reasons, to the relatively high price of the plastic materials in the production of units having a mechanical strength comparable with that of the conventional wooden and metal boxes of the same capacity, on the one hand, and other concomitant difficulties to produce a case of relatively light weight and possessing an adequate flexibility at a price to place the same on a competitive basis with the standard wooden or metal cases at present being used by the industry.

Accordingly, an important object of the present invention is the provision of a unitary or one-piece plastic carrying case or tote box of the type referred to by which the afore-mentioned and related defects and disadvantages of the prior attempts to produce such cases are substantially eliminated.

Practical tests and experience with wooden and metal cases have shown that one of the major problems in the shipment and distribution of relatively fragile containers, such as glass bottles as used for beer, soft drinks etc. and waxed cardboard containers commonly used for milk, fruit juices and the like, consists in the suppression of the effects of mechanical shock or vibration of the containers during both handling and shipment and being due mainly to the rigidity of the wooden and metal cases, which the result of abrading or scuffing of the card-board containers, or outright breakage of the glass bottles, and in turn, leakage or complete loss of the liquids and other goods stored and being shipped.

The foregoing drawbacks and defects assume an especially serious nature in the shipment of the goods or liquids from the production site by mechanical conveyers to the trucks or the like delivery vehicles for transportation to the supermarkets or other distribution centers.

Another object of the invention is, therefore, the provision of a light-weight plastic carrying case of the type referred to which, while having a mechanical strength comparable with that of the standard wooden or metal cases of corresponding storage capacity, possesses an adequate flexibility in yielding to or absorbing shock or vibrational forces, to protect the bottles or other containers against damage or destruction during shipping and handling.

Another requirement in the use of carrying cases of the type referred to is the stacking of a plurality of cases both for storage and transport, thereby making necessary an adequate mechanical strength or resistance of the stacked cases to sustain the static load or pressure upon the lowermost case of the stack by the fully loaded cases stacked thereon, aside from the required resistance to dynamic or vibrational forces mentioned hereinabove.

Accordingly, yet another object of the present invention is the provision of a plastic carrying case of the type referred to being constructed to be both light in weight compared with standard wooden or metal cases of comparable capacity, while at the same time possessing adequate mechanical strength or resistance to both static and dynamic or vibrational forces or stress, thereby to enable the stacking of a plurality of full loaded cases, securely and expeditiously on the one hand, and to substantially prevent damage to or destruction of the relatively fragile containers stored in the cases, or to avoid leakage or loss of the liquids or other goods stored and being shipped, on the other hand.

In the practical use of carrying cases or tote boxes of the type referred to, the cases may be used with an open top, such as for shipping and distributing milk in cardboard or the like opaque containers, or a cover may be required to shade or protect the liquids from incident light, in particular for the shipment of beer and the like liquids in bottles or other light-pervious containers.

Another object of the invention is, therefore, the provision of a unitary molded tote box or plastic carrying case of the type referred to with a cover forming an integral part of the case and adapted to be easily and readily opened and closed, said cover advantageously being designed to provide added support for another case placed thereon in a stack comprising a plurality of cases in the manner pointed out.

Among the various further and ancilliary objects of the invention is the provision of a light-weight plastic carrying case or tote box of the type referred to which is relatively easy to handle compared with the conventional wooden and metal cases; which is impervious to moisture, clean and virtually maintenance free; which is easily and readily interchangeable with existing wooden and metal boxes of comparable storage capacity; and which is highly resistant to chemicals, in particular acids, as well as to extreme temperature cycles, aside from its high dimensional stability and resistance to both static and dynamic forces as well as other advantageous properties and characteristics pointed out hereinabove and becoming further apparent as the following description proceeds.

The invention, both as to the foregoing objects as well as novel features and aspects thereof, will be better understood from the following detailed description, taken in conjunction with the accompanying drawings forming part of this specification and in which;

FIG. 1 is a perspective view of a plastic carrying case or tote box having an open top and being constructed in accordance with the principles of the invention, the case illustrated being designed especially, though not limitatively, for the storage and shipment of rectangular cardboard or the like containers, as used for the distribution of milk and other foods or liquids;

FIG. 2 is a fractional partly sectional and partly perspective bottom view showing the construction of the reinforcing channels in the bottom wall of the case according to FIG. 1;

FIG. 3 is a complete bottom view of the case shown by FIG. 1;

FIG. 4 is a fractional perspective view of the inside of the case of FIG. 1 being taken on lines 4—4 of FIG. 5 and more clearly showing the storage of the articles or containers;

FIG. 5 is a plan view of the case shown by FIG. 1;

FIG. 6 is an enlarged fractional view of FIG. 5 more clearly showing a corner portion of the case;

FIG. 7 is a section taken on line 7—7 of FIG. 6;

FIG. 8 is a fractional vertical cross-section showing a plurality of cases according to FIG. 1 stacked one upon the other;

FIG. 9 is a perspective view similar to FIG. 1 and showing the case of the latter provided with a cover constructed in accordance with the invention;

FIG. 10 is a partial perspective inside view of the case according to FIG. 9, more clearly showing the separating walls or partitions for the storage of round articles, such as bottles;

FIG. 11 is a partial plan view of the case of FIG. 9;

FIG. 12 is a partial sectional view taken on line 12—12 of FIG. 9 and showing the cover immediately prior to its closed position;

FIG. 13 is a full sectional view taken on line 12—12 of FIG. 9 and illustrating the cover in its fully closed position; and FIG. 14 is a fractional bottom view of a corner portion of FIG. 9.

Like reference numerals denote like parts and elements throughout the different views of the drawings.

With the foregoing objects in view, the invention involves generally the provision of a carrying case of the type referred to being comprised of an integrally molded or one-piece structure of high-impact synthetic plastic and including side, end and bottom walls of relatively small thickness and weight compared with the thickness and weight of conventional wooden and metal cases of comparable storage capacity. In order to provide the necessary strength or resistance to static forces or pressure, to enable both handling and stacking of the cases, the end and side walls are provided at their upper edges with a pair of spaced outwardly projecting flanges forming a perimetric reinforcing rim portion of U-shaped cross-section, and the side and end walls are furthermore provided at their lower edges with at least one outwardly projecting flange, whereby to enable stacking of a plurality of cases with the lower flange of one case resting upon the rim of the preceding case of the stack, on the one hand, and to afford handling of the cases by the provision of suitable hand holes in the opposite side or end walls and located underneath and directly adjoining said rim portion. If desirable, intermediate reinforcing or stiffening ribs or webs may be provided between said upper and lower flanges, to improve the stability or resistance of the case to static pressure or stress, in the manner shown and described hereafter.

In order to strengthen or reinforce the bottom wall of the case and at the same time to provide adequate flexibility or resistance to dynamic forces, such as shocks or vibrations, to protect the relatively fragile containers stored therein, in particular bottles and cardboard or the like containers, the bottom wall in accordance with the improvements of the present invention is provided with two sets of parallel and outwardly facing reinforcing channels arranged with the channels of one of said sets intersecting the channels of the other set. The channels have a width being equal to a multiple of the thickness of said bottom wall, whereby the bottom portions of the channels form a supporting surface of the case and the side portions of the channels terminate in a plurality of raised or elevated juxtaposed supporting platforms provided with symmetrical and preferably scallop-shaped openings. Furthermore, the channels are spaced by distances such that said platforms conform to the dimension of the bottles, containers or the like articles to be supported thereby and stored in the case, in the manner as will become further apparent as the following description proceeds.

There is thus provided by the invention both the necessary mechanical strength of the case, as well as an adequate flexibility of the bottom wall by the special construction outlined, whereby to dampen or absorb shocks or vibration to which the cases are subjected during use and to thereby protect the containers stored therein against damage or destruction.

In the case of square containers, such as milk cartons or the like, the design may be such as to cause a predetermined number of containers to adjoin each other closely or to fit snugly in the case of given size without requiring any additional partitioning or aligning means. On the other hand, suitable spacing or partition walls may be provided being integral with or connected to the bottom of the reinforcing channels, for the storing of round articles, such as bottles, as will be further described in the following.

While the cases or boxes may be used with an open top and handled and shipped in the manner described, such as for use in connection with milk cartons and other opaque containers, shading against incident light may be achieved in the case of transparent containers, such as bottles, by the provision according to a further improved feature of the invention of an easily operable cover or top being integrally hinged with the case and advantageously designed to provide additional support in a stacked assembly of cases, as will be further understood from the following detailed description of the drawings.

Referring to the latter, FIGS. 1–8, there is shown an integrally molded rectangular carrying case or tote box comprising a pair of side walls 10, a pair of end walls 11 and a bottom wall 12, all having a minimum thickness compatible with other practical requirements, said side and end walls having their upper edges provided with a pair of outwardly projecting spaced flanges 10a, 10b and 11a, 11b, respectively, to form an upper perimetric reinforcing rim portion of U-shaped cross-section, and said side and end walls furthermore having their lower edges provided with at least one outwardly projecting lower flange 10c and 11c, respectively, whereby to enable stacking of a plurality of cases with the lower flange of one case resting upon the rim of the preceding case of the stack, as more clearly shown in FIG. 8 of the drawings. Proper positioning and alignment of the cases of a stack is attained in the manner to be described in and understood from the following. If desired, intermediate flanges or stiffening ribs 10d and 11d and reinforcing webs 10e and 11e may be provided to further improve the mechanical stability and resistance of the cases to withstand the static forces or pressures thereon during use.

The plastic material may be of any suitable composition having both adequate mechanical strength or dimensional stability as well as an adequate elasticity for the purposes pointed out, such as polyethylene or polypropylene, or the like readily moldable or polymerizable synthetic plastics known in the art.

As more clearly shown in FIG. 4, the bottom wall 12, in an effort to provide adequate mechanical strength or resistance to both static and dynamic stress during handling and shipment, is provided with two sets of spaced parallel and outwardly facing reinforcing channels 13a and 13b, respectively, acting as stiffening ribs and arranged with the channels of one set intersecting the channels of the other set. The channels 13a and 13b have side and bottom portions, the latter forming a supporting surface of the case and said side portions terminating in a plurality of raised or elevated and self-supporting platforms 14 equal in number to the number of containers or articles to be stored in the case and having a dimension substantially conforming to the dimension of said containers or articles, such as milk cartons 16 or the like as shown in the drawing. In order to provide both a stable support of the case, on the one hand, as well as flexible support for the containers, on the other hand, the width of the channels 13a and 13b is made a multiple, such as three times as shown, of the thickness of the bottom wall 12 of the case and the supporting platforms 14 are provided with symmetrical, preferably scallop-shaped, openings or apertures 15. The bottom or supporting areas of the channels are furthermore advantageously provided with ribs, flutes or otherwise roughened, as shown at 20, FIG. 2, to further improve the stability and to prevent slipping of the cases during storage and handling.

The design of the cases is furthermore advantageously such that the extreme channels 13a and 13b adjoin the lower flanges 10c and 11c, respectively, whereby to provide a seat or offset in conjunction with said flanges, for the positioning and aligning of the cases assembled in a stack, in the manner more clearly shown in FIG. 8.

In the FIG. 1 modification, the spacing distance between the channels 13a and 13b is such as to result in a close fit of a predetermined number of preferably square or rectangular articles or containers 16, substantially without requiring any intermediate spacing or partitioning means. In the case of differently shaped articles or containers, in particular round bottles, suitable lengthwise and transverse partitioning or spacing walls being integrally molded with the case may be provided, to result in a highly compact or unitized structure, as shown and described in the following.

In order to facilitate handling of the cases, suitable oblong hand holes 17 may be provided in the side or end walls immediately adjoining the lower edge of the rim portion or flanges 10b, 11b, said holes being advantageously skirted by a further flange 18 merging into the flange 11a in the example shown, to afford a firm grip on the cases during handling and use.

The flanges 10a, 10b and 11a, 11b may be provided with cross-ribs or webs 10e and 11e, especially near the rounded corners of the case or adjacent to the gripping holes 17, to further improve the mechanical strength and stability, in a manner readily understood.

Referring to FIGS. 9-14, there is shown a modified carrying case according to the invention being similar to that described hereinbefore and provided with an easily actuatable cover especially, though not limitatively, for the storage of transparent containers containing foods or other substances to be protected from incident light, such as beer bottles or the like. The case shown is further provided with longitudinal and transverse partition walls to facilitate the storage of round and other containers less suited for self-alignment than square or rectangular containers adapted for storage in cases of the type according to FIGS. 1-8.

For the latter purpose, the case shown by FIGS. 9-14, being otherwise constructed in a manner substantially similar to the case according to the preceding figures, is fitted with a cover being comprised of a pair of plates or panels 22 and 23 integral with the remaining structure and extending laterally from two opposed upper edges of the case, that is, from the outer edges of the flanges 10a in the example illustrated. As a consequence, the panels 22 and 23 upon being bent or swung inwardly towards the open top of the case about their connecting lines acting as hinges, as shown at x in the drawing, FIG. 12, by virtue of the flexibility of the plastic material, will result in the closing of the top of the case upon meeting and locking of the free inner ends or edges of the panels, FIG. 13. For the latter purpose, the panels 22 and 23 are advantageously provided with flanges or projections 22a and 23a extending transversely from the inner end thereof, on the one hand, and shoulders or offsets 22b and 23b adjoining the inner edges of the upper flanges 10b of the case, on the other hand, whereby to effect a firm locking of the panels by the shoulders 22b and 23b engaging the upper edges of the case and by the projections 22a and 23a frictionally engaging one another in the fully closed position of the case, FIG. 13.

In order to facilitate the closing and opening operations, the projections 22a and 23a consist of first right angular portions adjoining the edges of the panels and being followed by arc-shaped portions with the hinges x forming the center of the arc. As a consequence, there is ensured in this manner a smooth and secure closing and opening of the case by the meeting of the panels with a snap action, on the one hand, and upon exerting a slight upward pressure upon the edges of the projections 22a and 23a through suitable openings 28 in the end walls 11 of the case above the hand holes 17. In order to ensure a firm initial gripping of the inner flanges 22a and 23a prior to the closing position of the panels, FIG. 12, the meeting surfaces of said flanges may be fluted or otherwise roughened to increase the friction and to ensure a firm locking of the panels in the closed position, FIG. 13.

Furthermore, in order to improve the flexibility of the hinges, the panels are advantageously provided with a series of spaced perforations or slots 26 along the hinge line x.

There are furthermore shown in FIGS. 9-14 two sets of longitudinal and transverse partition walls 24 and 25 being symmetrical to the bottom portions of the channels 13a and 13b, respectively, and molded to each other and to said bottom portions and the side and end walls 10 and 11 of the case, to form a unitary structure, in the manner shown by the drawing. Such a departmentalized case is especially suited for the storage of round bottles or the like articles or containers less suited for self-alignment than square or rectangular containers or articles, such as the conventional milk and the like cardboard containers.

In the forgoing the invention has been described in reference to a specific illustrative device. It will be evident, however, that variations and modifications, as well as the substitution of equivalent parts and elements for those shown herein for illustration, may be made without departing from the broader scope and spirit of the invention as set forth in the appended claims. The specification and drawings are accordingly to be regarded in an illustrative rather than in a restrictive sense.

I claim:

1. A carrying case for the storage and transport of relatively fragile liquid containers comprising in combination:
   (1) an integrally molded structure of high-impact synthetic material having side, end and bottom walls,
   (2) said side and end walls being formed at their upper edges with a pair of spaced outwardly projecting flanges, to provide a reinforced rim of U-shaped cross-section,
   (3) said side and end walls being further provided at their lower edges with an outwardly projecting flange, to enable stacking of a plurality of cases with the lower flange of one case being aligned with and resting upon the rim of the next lower case of a stack,
   (4) said bottom wall being formed with two sets of parallel channels having side and bottom portions with the channels of one set being normal to and intersecting the channels of the other set,
   (5) the width of said channels being a multiple of the thickness of said bottom wall and the channels of both said sets being spaced from each other by a distance, whereby said bottom portions form a stable supporting surface of the case by the stiffening action of said channels and said side portions form, together with the intervening portions of said bottom wall, a plurality of discrete self-supporting and relatively flexible platforms having a dimension substantially conforming with the dimension of the containers to be supported each by one of said platforms in mutually adjoining relation with the other containers stored within said case.

2. In a carrying case as claimed in claim 1, said platforms being provided with central symmetrical openings.

3. In a carrying case as claimed in claim 1, the outer side portions of the extreme channels of each said sets adjoining said lower flanges such as to nest with the upper edges of the next lower case of the stack.

References Cited by the Examiner
UNITED STATES PATENTS

| | | |
|---|---|---|
| D. 194,808 | 3/63 | Stevens. |
| 2,467,698 | 4/49 | Reynolds _____ 220—21 |
| 2,747,030 | 4/56 | Read. |
| 2,753,077 | 7/56 | Greco _____ 220—97 |
| 3,002,650 | 10/61 | Lovell. |
| 3,080,087 | 3/63 | Cloyd _____ 220—31 |

FOREIGN PATENTS

| | | |
|---|---|---|
| 566,722 | 4/58 | Belgium. |
| 813,678 | 9/51 | Germany. |

THERON E. CONDON, *Primary Examiner.*

EARLE J. DRUMMOND, *Examiner.*